United States Patent [19]

Toenshoff

[11] 4,146,957

[45] Apr. 3, 1979

[54] THICK FILM RESISTANCE THERMOMETER

[75] Inventor: Donald A. Toenshoff, Jackson Township, Ocean County, N.J.

[73] Assignee: Engelhard Minerals & Chemicals Corporation, Iselin, N.J.

[21] Appl. No.: 760,044

[22] Filed: Jan. 17, 1977

[51] Int. Cl.² .......... B05D 5/12; B05D 1/32; H01C 7/02; H01C 17/00

[52] U.S. Cl. .......... 29/612; 29/620; 427/102; 427/125; 427/282; 427/376 A; 427/376 B; 427/383 A; 427/383 B; 252/514; 338/25; 338/28

[58] Field of Search .......... 427/102, 125, 282, 376 A, 427/376 B, 383 A, 383 B; 338/25, 28, 307; 252/514

[56] References Cited

U.S. PATENT DOCUMENTS

| 3,629,776 | 12/1971 | Watano | 427/102 |
| 3,699,650 | 10/1972 | Cocca | 427/102 |
| 3,781,749 | 12/1973 | Iles et al. | 427/102 |
| 4,028,657 | 6/1977 | Reichelt | 338/307 |
| 4,050,052 | 9/1977 | Reichelt | 338/307 |

OTHER PUBLICATIONS

McGraw Hill Encyclopedia of Science and Technology, p. 418.

Primary Examiner—Michael F. Esposito
Assistant Examiner—Richard Bueker

[57] ABSTRACT

A folded, highly pure platinum, thick film, path on a ceramic cylindrical substrate provides a high TCR of about 3850 ppm/° C. The path is applied by screen printing a thick film paste onto a substrate and then firing the paste at a time and temperature sufficient to bond the path to the substrate and to produce a TCR of at least about 3850 ppm/° C. The paste is comprised of about 20% by weight of an organic carrier into which 80% by weight of particles have been mixed. The particles are 96% by weight platinum particles of less than about ten microns size and 4% by weight of a contaminant-free vitreous glass frit of less than ten microns size.

9 Claims, 3 Drawing Figures

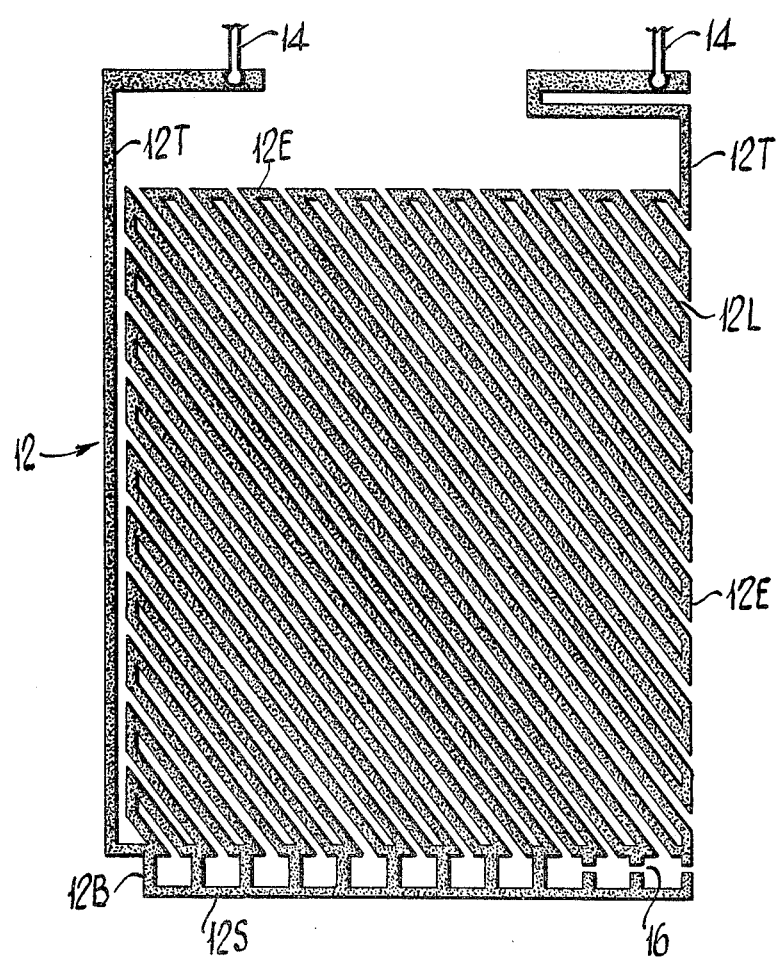

THICK FILM RESISTANCE THERMOMETER

BACKGROUND OF THE INVENTION

This invention relates to a metal film having a uniform change of resistance with temperature and to the method of manufacturing such film. In its more specific aspect, this invention relates to resistance thermometers manufactured from high purity platinum desirably formed on a ceramic substrate in a particular configuration or pattern.

Resistance thermometers, such as those made with solid wire, measure temperature by measuring the resistance of the metallic element. That is, resistance of the metal is dependent on the temperature, and therefor measuring the resistance provides a measurement of the ambient temperature.

Thick film technology is used in the field of microelectronics for the manufacture of conductors and resistors. Typically, a precious metal or metals such as platinum, gold or silver is bonded to a substrate usually with a vitreous material. Thick film, as distinguished from a thin film, is generally considered to be a metal layer ranging in thickness from approximately 0.005 millimeters to 0.030 millimeters, and usually refers to a paste or ink applied by screen printing in the manufacture of the circuit. Thin film generally is applied by vacuum processes, and the metal layer thickness is generally expressed in angstroms and may range up to approximately 10,000 A° (0.001 mm).

Thick film technology for the manufacture of thermocouples is disclosed in U.S. Pat. No. 3,099,575 to Hill. According to the teachings of this patent, one or more precious metals are suspended in an organic vehicle, and the resulting paste is printed on a substrate such as fused quartz. The film is then fired, thereby bonding the metal to the substrate and producing a thick film thermocouple. U.S. Pat. No. 3,781,749 to Iles and Selman specifically discloses a thick film metal layer structure for a resistance thermometer. Here the precious metal is bonded to the substrate with a vitreous material in an electrically conducting tortile path.

An important characteristic for a commercially useful resistance thermometer is that it have a high temperature coefficient of resistance (TCR), typically measured in parts per million per degree Centigrade (ppm/° C.). For example, one standard in the industry for platinum wire resistance thermometers is 3850 ppm/° C. (e.g. 0.003850 ohms per ohm-degree Centigrade). For a typical thermometer having an overall resistance of 100 ohms at the ice point (0° C.), the resistance will increase by an average of 0.385 ohms for each one degree increase of temperature in a range from 0° C. to 100° C. A high TCR is advantageous in that the higher the TCR the greater the change in resistance per degree Centigrade, which simplifies instrumentation and lowers the costs of equipment. Pure platinum has a TCR of 3928+ ppm/° C. and this value is approached by laboratory grade thermometers which may have TCR's of 3927+ ppm/° C. For industrial use, numerous standards have been suggested and used. The TCR value of 3850 ppm/° C. has been adopted widely in Europe and is expected to be in common use in the United States as well. It has been difficult to achieve a TCR of 3850 ppm/° C. with thick films, as was disclosed in U.S. Pat. No. 3,781,749. One object of this invention is to provide a TCR of 3850 ppm/° C. or higher employing thick film techniques.

The TCR of a useful thermometer must exhibit stability, which is defined as the ability to maintain its specified resistance, temperature characteristics for long periods of time while being operated within its special temperature limits. This invention has another object to provide a resistance thermometer exhibiting good stability, desirably of a configuration which permits retrofit use with the various resistance thermometers, generally cylindrical units, that are currently in use.

DESCRIPTION OF THE INVENTION

In accordance with the invention, a thick film paste is formed comprising a dispersion or suspension of 99.9% pure platinum powder and a vitreous material such as glass frit in an organic medium or vehicle. The high purity of the platinum is important if a high TCR is to be obtained. Thus platinum contamination must be avoided during the milling of paste and firing of the film. The platinum powder may be in spherical or flake form and should have a diameter of approximately ten microns or less, and preferably an average diameter of two microns or less in the finished paste as determined by a Coulter counter, which is in widespread use by the industry. It is important that the platinum particles in the paste are not agglomerated and that the particles are substantially uniform in size in order to achieve sharply defined edges in the film pattern deposited on the substrate. Since firing of the film is conducted at a relatively high temperature, as explained below in greater detail, spherical type platinum powder is quite acceptable, but where desired platinum flakes are also suitable.

The platinum powder has a relatively high tap density as determined by a modified A.S.T.M. Standard method B527-70. It is important that the metal, as the electrically conducting element, form a continuous pattern in the fired product. If the tap density of the particles is too low, there is excessive shrinkage on firing and the metal agglomerates thereby forming discrete islands of metal and interruptions in the conducting path. A relatively high tap density may be achieved in utilizing a very fine powder, desirably less than ten microns in diameter, having a relatively low surface area. The tap density should not be less than about 20 percent of the fused density (21.45 g/cc), and preferably is above about 25 percent of the fused density.

The glass frit which typically ranges in size from about one to three microns, affects adhesion to the substrate. Therefore, sufficient frit should be employed in the suspension to bond the metal to the substrate. The quantity of frit used depends largely on the width of the film to be printed. If the quantity is too high, globules of frit form on firing thereby disrupting the uniformity of the film. I have found that pastes containing from four to eight percent frit by weight of the platinum and frit admixture is most suitable, but the paste can contain more or less than this amount depending on such factors as the type of frit, the shape and size of the platinum particles, the type of substrate, the width of the printed pattern, and the firing temperature and time.

It is particularly important that the frit be essentially free of contaminants or impurities which can adversely effect the TCR and/or stability of the fired product. Minute quantities of lead in the glass frit, for example, will lower the TCR significantly. Other contaminants or impurities which may degrade the fired product include, for example, bismuth, tin and certain alkali or alkaline earth metals. Borosilicate glass, which typically contains more than 60 percent by weight silica, is especially useful. Such lead-free glass frits melt or fuse in the neighborhood of from about 975 to 1050° C. Because the glass may be a source of contamination, it usually is not desirable to use more than about 10 percent by weight frit based on the total weight of platinum and frit mixture.

The platinum powder and glass frit are admixed, and an organic vehicle is added to adjust the viscosity of the ink. The paste is ink milled to establish a shearing relationship between the particles so that the vehicle wets each sheared particle. The paste should exhibit the proper rheology so that upon application to the substrate, such as by screen printing, flow occurs to fit the pattern but the paste then stiffens so as to retain the sharp pattern boundaries. Typical organic vehicles include, for example, resins such as polystyrenes, polyterpenes, polymethacrylates and ethyl cellulose and solvents such as butyl carbitolacetate, ethyl naphthalene, phenylcyclohexane, terpenes such as pine oil, alpha-and beta-terpinol ad the like, and mixtures of aliphatic and aromatic hydrocarbons. The quantities of vehicle used will be adjusted to provide the paste consistency needed for each application.

The paste is printed onto a ceramic or refractory substrate to form a continuous path. Numerous materials are used in the manufacture of substrates, and may include alumina, 96% aluminum oxide, aluminasilica, etc., and the type of substrate will depend largely on its properties and the end use. Further, the substrate may have an arcuate surface such as circular or elliptical. The printed substrate is then fired at a relatively high temperature, which may be varied depending on the firing time, above the melting point of the glass frit but below the melting point of the platinum (i.e., 1772° C.), usually 100° C. or more below, and more preferably 250° C. or more below the platinum melting point. The temperature and time is governed largely by practical limits, but usually the print is heated for about one half hour to reach the peak firing temperature, held there for about fifteen minutes and then cooled for fifteen minutes. The peak firing temperature should be at least 1450° C., and more preferably at about 1500° to 1550° C. The fired-on path may be protected by an overglaze, usually a vitreous glass, which is selected to fuse at a temperature substantially below the firing temperature of the film.

For retrofit applications cylindrical substrates are commonly used and the paste may be printed onto such cylinders by known rotary printing means. A typical cylinder may be approximately 0.5 cm in diameter and 2.5 cm in length. The preferred configuration of the printed line is a rectangular folded path having a large plurality of legs (e.g., eighteen legs) connected at alternate ends by end segments. The width of the path is about 1/6th mm.

The resistive path is continuous and may be about 1/6th mm wide. The legs of the path extend in a generally axial direction along the surface of the ceramic cylinder. The configuration of the path may be considered to be a spatial rectangular wave having relatively large amplitude (about 1.8 cm) and relatively small period (about ⅔ mm). More generally, it is folded rectangular path. The two end legs of the path are side bars having a width of approximately ⅛ mm. Alternatively, the path configuration may be laid out at an angle to the axis of the cylinder in order to facilitate accurate forming of the path resistance.

The platinum path configuration printed on the surface of the ceramic cylinder includes extensions from some of the end segments and a shorting bar across these extensions. In manufacture, these extensions are opened, one at a time, by sandblasting or laser trimming until the path resistance is brought up to just below the predetermined value. The width of the relatively wide end legs are then trimmed to fine tune the resistive value of the path up to the precise predetermined magnitude.

BRIEF DESCRIPTION OF THE DRAWINGS

FIG. 3 is a schematic representation of an alternative path configuration.

DESCRIPTION OF THE PREFERRED EMBODIMENTS

Figure 1:
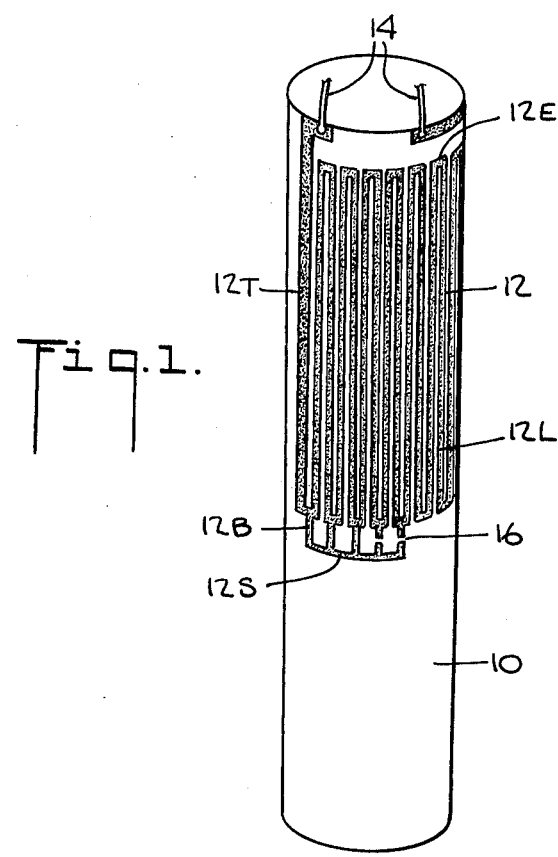
FIG. 1 is a perspective view of an embodiment of the invention illustrating a platinum path configuration on a ceramic cylinder together with input and output leads thereby providing a resistance thermometer.

In order to achieve the relatively high TCR of 3850 which is desired when thick film resistance thermometers of the invention are to be substituted for conventional wire wound thermometers, it has been found to be important to use a platinum powder having a high purity, preferably 99.9+% and to provide a suitable particle size as measured by particle size distribution, BET surface area and tap density. Another important aspect of the invention is the discovery that firing at unusually high temperatures in the range of 1450° C. and above is necessary in order to develop the high TCR desired in the finished thermometer. The significance of these features of the invention are shown in the following examples.

EXAMPLE I

One platinum powder which has been found to be suitable in making a thick film resistance thermometer having a high TCR has a surface area of 2.6 $m^2$/gm as measured by the usual BET procedure. The particle size distribution in the powder before mixing is as follows:

90% by weight less than 49.6 microns
50% by weight less than 18.1 microns
10% by weight less than 2.5 microns When inspected under the microscope, this material is seen to consist largely of very small particles, probably of less than 2 microns diameter, but agglomerated into the large particles reported above. The tap density of this powder is measured as 7.44 gm/cc by a modification of A.S.T.M. standard method B-527-70. This modification employs instead of the usual 50 gm sample tapped 3000 times a 10 gm sample tapped 1500 times with a commercially available Tap-Pak Volumeter. This material was mixed with a contaminant-free frit (borosilicate containing trace quantities of lead, bismuth, tin, and other known contaminants below which levels effect the TCR) and with a suitable amount of an organic carrier having approximately 15 parts by weight ethyl cellulose and approximately 85 parts by weight of butyl carbitolacetate. The resulting paste contains approximately 80% by weight platinum and frit and 20% by weight of the organic carrier. The paste is milled on a commercially available three roller ink mill. During this milling process, the larger agglomerates are believed to be separated into the smaller constituent particles. About 90% of the particles are less than about 10 microns diameter, with none greater than 15 microns. This measurement of particle size may be conveniently done by a conventional drawdown test. A metal block is used which has flat bottomed grooves machined into its surface, starting at the surface of the block and tapering to a depth greater than the maximum particle diameter. The paste to be tested is applied by a squeegee into the grooves. When the groove depth equals the diameter of particles in the paste, the squeegee pushes the particles ahead of it, leaving bare spaces in the film and thereby indicating generally the particle size of the bulk of the paste. By use of such a test it is unnecessary to separate a sample of the particles from the paste and remeasure the particle size distribution in a Coulter counter as was done to determine the particle size distribution of the fresh powder given above. The finished paste is then screened onto a ceramic substrate in the desired pattern and fired.

Firing of the paste onto the substrate may be done in the presence of air in the types of furnaces used commercially for thick film processing, except that the temperature used is higher than those normally used. A typical heating cycle involves ½ hour of heating to the peak temperature, holding ¼ hour at that temperature, and then cooling for ¼ hour. The following results were obtained with the above described paste when fired according to such a schedule but at various peak temperatures:

| Temperature, ° C. | TCR (ppm/° C.) |
| --- | --- |
| 965 | 3750 |
| 1095 | 3822 |
| 1480 | 3846 |
| 1500 | 3850.5 |

As will be seen from the table a relatively high TCR can be obtained at a typical commercial firing temperature of about 1000° C. However, in order to obtain the desired TCR of 3850 ppm/° C., it is necessary to use a substantially higher temperature, generally above 1450° C. While the table above indicates that for these standard conditions 1500° C. would be required, it is believed that extending the firing time at peak temperature can raise the TCR to the desired value at a lower temperature. This will be shown in the following example.

EXAMPLE II

The paste of Example I was printed on a ceramic substrate and fired under the same conditions as given above except that the peak temperature was 1000° C. and the time at the peak temperature was extended beyond the usual ¼ hour, with the following results:

| Minutes at 1000° C. | TCR (ppm/° C.) |
| --- | --- |
| 10 | 3744 |
| 100 | 3783 |
| 1000 | 3802 |

These results indicate that extending the time at peak temperature increases the TCR. The same material, after being exposed to 1000° C. for 1000 minutes, was refired to 1200° C. for 15 minutes achieving a TCR of 3838 ppm/° C., indicating that even after an extended period at peak temperature, further improvement was still possible by raising the maximum temperature. Thus, it should be possible to use peak temperatures slightly below 1500° C. if one is willing to accept a somewhat extended period at peak firing temperature.

As mentioned above, purity of the platinum and particle size are significant factors in achieving the desired high TCR according to the invention. In the examples which follow pastes having a low tap density (Example III) and a low platinum purity (Example IV) are used to show the significance of these two factors.

EXAMPLE III

A sample of platinum powder having a purity of 99.9+% was prepared as a paste according to the procedure and with the ingredients as described. After screening a pattern on a ceramic substrate it was fired according to the typical schedule holding a peak firing temperature of 995° C. for 15 minutes. A TCR of 3271 ppm/° C. was achieved. The peak temperature was increased in an attempt to obtain a TCR of 3850 ppm/° C. but it was not possible to reach the preferred 1500° C. firing temperature because shrinkage of the film created an open circuit in the resistance film. The particles of platinum separated during the higher temperature firing, creating an electrical discontinuity in the film.

Examination of the platinum particles in this unsuccessful paste showed that instead of a low surface area and high tap density as in the previous example, the platinum powder had a surface area of 15.5 $m^2$/gm and a tap density of 0.85 gm/cc. Both factors suggest that the platinum particles were unusually small. However, a sample of the particles after milling proved to have the following size distribution as measured by Coulter counter: 90% by weight less than 13.5 microns; 50% by weight less than 6.4 microns; and 10% by weight less than 3.3 microns. Thus, while the particle size would appear to be similar to that indicated to be present in the satisfactory paste of Example I, the particles as indicated by the surface area and tap density had substantially different characteristics. Thus a higher tap density is preferred, generally above 20% of the fused density (21.45 gm/cc), or above about 5 gm/cc.

EXAMPLE IV

Another paste was made with a material which in many respects appeared to be satisfactory, but having a platinum purity less than 97.4%, it was found that upon firing the following results were obtained:

| Peak Temperature, ° C. | TCR (ppm/° C.) |
| --- | --- |
| 1035 | 3236 |
| 1235 | 3717 |
| 1540 | 3758 |

Based on knowledge already available in the solid wire wound thermometer industry, the importance of platinum purity on TCR was known. It appears that for thick film resistance thermometers the purity of the platinum should be 99.9+% if a high TCR of 3850 ppm/° C. or more is required. This material was found to have a surface area of 2.3 $m^2$/gm and a tap density of 5.27 gm/cc and would otherwise appear satisfactory. Particle size after ink milling was measured by Coulter counter to be 90% by weight less than 3.6 microns; 50% by weight less than 1.9 microns; and 10% by weight less than 1.4 microns.

It is concluded that, while particle size distribution is important in establishing that a paste can be satisfactorily screen printed (that is, can pass through the screen openings), the surface area and tap density are valuable indicators of the probable success in preparation of thick film resistance thermometers having the high TCR of 3850 ppm/° C.

The two FIGURES relate to the same embodiment and thus common elements are referred to by the same reference numbers. The ceramic cylinder 10, which in one embodiment is about 2½ cm. long and about 0.5 cm. in diameter, provides a substrate. In accordance with this invention, a high purity platinum path 12 is printed on the surface of the cylinder 10. Pure platinum wire electrode leads 14 are welded to respective ends of the path 12.

The path 12 is a layer of platinum that is approximately 0.010 mm. thick. Thus the path is a thin strip and has appreciable resistance. The illustrated embodiment has a resistance of 100 ohms. Specifically, the path 12 is trimmed to the point where precisely 100 ohms is obtained between the leads 14 at the ice point (0° C.). In the embodiment illustrated, the legs 12L of the folded path 12 are approximately 1.25 cm. long and the width of the strip which constitutes the path 12 is slightly less than 0.2 mm. The uncoated distance between adjacent legs 12L of the path 12 is also 0.2 mm. As illustrated, the path 12 constitutes a plurality of legs 12L connected by end segments 12E. The terminal leg segments 12T are substantially thicker than the rest of the leg segments 12L, and in one embodiment, are initially printed with a width of approximately 0.6 mm. A strip 12S is printed as shown below the lower portions of the ends 12E and is connected to five of the ends 12E by branches 12B. This strip 12S is called a shorting bar because it serves to bypass (and thus short out) those legs 12L across which it spans. However, where the branches 12B are opened, as indicated by the gaps 16, the shorting bar 12S is ineffective to bypass the associated legs 12L. In the embodiment shown in FIG. 2, there are five branches 12B but two of them have been opened up so that only four of the legs 12L are bypassed.

An alternate, but similar, configuration is illustrated in FIG. 3. The plurality of legs are placed at an angle to the axis of the cylinder. Shorted extensions from about one-half of the end segments may be provided as is shown. In this arrangement the legs have a plurality of lengths and accordingly have different resistances. As these extensions are opened by trimming the path resistance increases in nonuniform increments depending on which particular segment is opened.

Figure 2:
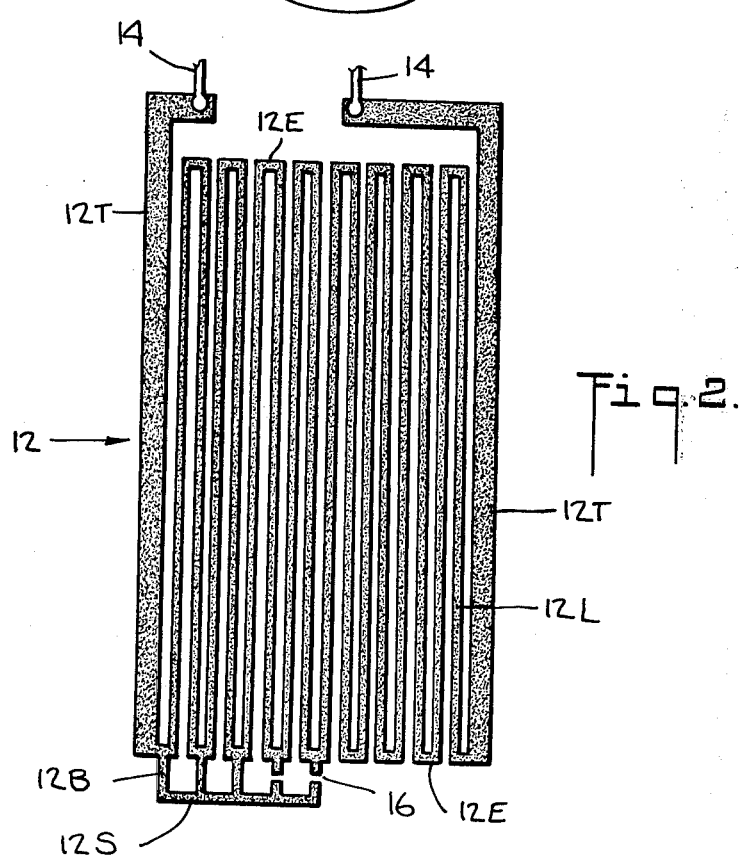
FIG. 2 is a more schematic representation of the path configuration shown in FIG. 1 laid out flat.

In the pattern of FIG. 2, each opened extension may increase the total path resistance by approximately 8 ohms. The alternate configuration of FIG. 3 provides the ability to increase the path resistance in steps ranging from approximately 10 ohms to 0.5 ohm. As an example, the following changes in path resistance were recorded for systematically opening all extensions: 7.3 ohm, 6.7, 5.8, 5.5, 4.3, 3.5, 2.5, 1.8, 1.0 and 0.5. This provision permits rough trimming to increase resistance up to within approximately 0.5 ohm of the desired value of about 100 ohms for a completed resistance thermometer. The final trim is accomplished by either reducing the width of the wide end legs, or cutting a slot in a widened end tab as indicated in FIG. 3.

The method of fabricating the product shown is of major importance to attain the objectives of this invention. The folded rectangular path 12 is a continuous strip of very pure platinum that has been printed onto the surface of the cylinder 10 and because of its purity provides a high temperature coefficient of resistivity, in particular an average TCR of 3850 parts per million per degree centigrade over the temperature range 0° C. to 100° C. Thus, where the total resistance between the two terminals 14 is approximately 100 ohms, each one degree centigrade change in temperature will result in a change of resistance equal to 0.385 ohms. This measurable change in resistance provides an accurate measurement for all small temperature changes.

EXAMPLE V

In fabricating the article shown in FIG. 1, a paste containing 99.9% pure platinum powder and contaminant-free borosilicate glass is milled in admixture with an organic vehicle. The particulate portion comprised four percent by weight frit based on total platinum and frit.

The organic carrier is a combination of approximately 15 parts by weight of ethyl cellulose and approximately 85 parts by weight of butyl carbitolacetate. The acetate acts as a solvent and the cellulose acts as a thickener. The resulting paste is approximately 80% by weight platinum and glass frit particles and 20% by weight organic carrier. When mixed together, these constituents provide a paste which is silk screened onto the ceramic substrate 10 by a conventional rotary printer. After the application, the paste is fired at a peak temperature of 1450° C. (to effect proper bonding of the thick film strip onto the substrate) and up to six hours at peak temperature may be necessary to develop the necessary TCR.

A vitreous overglaze (borosilicate containing insignificant quantities of lead, bismuth, tin and other known contaminants) is placed on the platinum film to protect it. The vitreous overglaze is selected to fuse at about 1150° C., well below the firing temperature of the film. It was observed that the thick film strip 12 remained affixed to the substrate 10 during the overglazing process even though the fusion temperature of the overglaze applied was above the fusion temperature of the frit used in the thick film paste. The use of this relatively high temperature overglaze is believed to provide greater assurance that the platinum strip 12 will remain dimensionally fixed and thus provide greater assurance that its operating characteristics will remain stable.

The temperature coefficient of resistance of the fired-on film was 3850 ppm/° C. Further, the stability of the resistance thermometer was determined by soaking the thermometer in a furnace for about 24 to 72 hours at a temperature of 500° to 800° C., removing the thermometer and measuring the resistance at 0° C. The process is repeated for a total of 1500 hours. It was found that the resistance change in equivalent degrees was less than 1° C., and in many cases as low as 0.1° to 0.5° C., thereby demonstrating a relatively stable thermometer.

What is claimed is:

1. A method of fabricating a stable thick film having a high temperature coefficient of resistance and a uniform change of resistance with temperature, which comprises
    (a) preparing a paste comprising substantially non-agglomerated platinum powder having a purity of at least 99.9%, a substantially contaminant-free frit, and an organic vehicle;
    (b) applying said paste as a continuous thick film strip onto a ceramic substrate; and
    (c) firing said strip at a temperature of at least 1450° C. to produce a TCR of at least about 3850 ppm/° C. in the fired film.

2. The method of claim 1 wherein said platinum has a tap density above about 5 gm/cc, said paste contains from about 4 to 8% by weight of said frit, and said firing is at a temperature of at least about 1500° C.

3. The method of claim 1 further comprising the step of:

applying a vitreous overglaze to the fired-on strip.

4. The method of claim 1, wherein said paste contains no more than about 10% by weight of frit based on the total weight of platinum and frit mixture.

5. A method of fabricating a resistance thermometer utilizing a stable thick film resistence path having a high temperature coefficient of resistance and a uniform change of resistance with temperature which comprises (a) preparing a paste comprising substantially non-agglomerated platinum powder having a purity of at least 99.9%, a substantially contaminant-free glass frit, and an organic vehicle, said paste containing from about 4 to 8% by weight of said frit based on the total weight of solids;

(b) applying said paste as a continuous thick film strip onto a ceramic substrate; and (c) firing said strip at a temperature of at least 1450° C. to produce a TCR of at least 3850 ppm/° C. in the fired film, and to effect a resistance change of less than 1° C. in equivalent degrees.

6. The method of claim 5 wherein said step of applying said paste includes:

applying said strip as a folded path having legs and end segments, said end segments connecting alternate legs at alternate ends thereof, applying a shorting bar strip spaced from a subset of said end segments, applying a set of extension strips, one each connecting a respective one of said end segments to said shorting bar, and applying an end leg of said path having a width substantially greater than the rest of said legs.

7. The method of claim 6 further comprising the steps of:

opening said extensions one at a time until a path resistance close to and less than a predetermined value is obtained, then trimming the width of said end leg to increase the path resistance up to said predetermined value.

8. The method of claim 6 wherein said legs are of substantially equal length and electrical resistance.

9. The method of claim 6 wherein said legs are of a plurality of lengths and electrical resistances.

* * * * *